(12) United States Patent
Mills et al.

(10) Patent No.: US 9,548,599 B2
(45) Date of Patent: Jan. 17, 2017

(54) THERMALLY MANAGED LOAD MODULE WITH EMBEDDED CONDUCTORS

(71) Applicant: Labinal, LLC, Denton, TX (US)

(72) Inventors: Patrick Wellington Mills, Bradenton, FL (US); James Michael McCormick, Bradenton, FL (US); David Michael Geier, Punta Gorda, FL (US)

(73) Assignee: LABINAL, LLC, Denton, TX (US)

( * ) Notice: Subject to any disclaimer, the term of this patent is extended or adjusted under 35 U.S.C. 154(b) by 0 days.

(21) Appl. No.: 14/533,245

(22) Filed: Nov. 5, 2014

(65) Prior Publication Data

US 2015/0062785 A1 Mar. 5, 2015

Related U.S. Application Data (63) Continuation-in-part of application No. 14/464,848, filed on Aug. 21, 2014, now Pat. No. 9,374,925, and a continuation-in-part of application No. PCT/US2014/051999, filed on Aug. 21, 2014.

(60) Provisional application No. 61/899,995, filed on Nov. 5, 2013, provisional application No. 61/870,420, filed on Aug. 27, 2013.

(51) Int. Cl.
*H02B 1/26* (2006.01)
*H02G 5/00* (2006.01)
*H02B 1/056* (2006.01)

(52) U.S. Cl.
CPC ............ *H02G 5/005* (2013.01); *H02B 1/056* (2013.01)

(58) Field of Classification Search
CPC ........ H01F 27/04; H01F 37/00; H01F 41/005; H01F 41/10; H02B 1/056; H02B 1/20; H02B 1/04; H02G 5/005; H02G 5/08; Y10T 29/4902; Y10T 29/49073; Y10T 29/49071; Y10T 29/49076
USPC ...... 29/605; 174/90; 336/196; 361/622, 636, 361/647, 634, 640, 637, 656
See application file for complete search history.

(56) References Cited

U.S. PATENT DOCUMENTS

| | | | |
|---|---|---|---|
| 2,395,374 A * | 2/1946 | Lembitz | H02G 1/1256 81/9.51 |
| 3,711,626 A | 1/1973 | Kilby | |
| 4,470,195 A * | 9/1984 | Lang | H01B 7/08 29/825 |
| 5,030,137 A * | 7/1991 | Bernhardt | H01B 7/0009 439/492 |
| 5,673,985 A | 10/1997 | Mitchell | |

(Continued)

FOREIGN PATENT DOCUMENTS

KR 20120028846 A * 3/2012 ............ H01L 25/03

OTHER PUBLICATIONS

International Search Report filed in PCT/US 2014/51999 mailed Nov. 26, 2014.

(Continued)

*Primary Examiner* — Timothy Thompson
*Assistant Examiner* — Guillermo Egoavil
(74) *Attorney, Agent, or Firm* — Rankin, Hill & Clark LLP (57) ABSTRACT

A load module for a power module in which the power module includes a housing assembly. The load module includes an epoxy body and a number of elongated conductive strands. Each of the conductive strand are partially disposed in the epoxy body and each of the conductive strands includes a conductive member and a limited insu- (Continued)

lator. Each of the limited insulators is disposed on selected portions of an associated conductive member.

10 Claims, 11 Drawing Sheets

(56) References Cited

U.S. PATENT DOCUMENTS

| | | | |
|---|---|---|---|
| 6,069,797 | A | 5/2000 | Widmayer et al. |
| 6,504,730 | B1 | 1/2003 | Cooney et al. |
| 6,704,181 | B2 | 3/2004 | Saksa |
| 6,877,211 | B2* | 4/2005 | Machado ............. H01F 27/027 |
| | | | 174/528 |
| 7,234,314 | B1* | 6/2007 | Wiggs ......................... 62/235.1 |
| 2005/0024842 | A1 | 2/2005 | Warenczak |
| 2005/0152100 | A1* | 7/2005 | Rodriguez et al. ........... 361/605 |
| 2010/0079230 | A1* | 4/2010 | Brubaker ................ H01F 37/00 |
| | | | 336/196 |
| 2011/0095408 | A1* | 4/2011 | Haba .................. H01L 23/3121 |
| | | | 257/673 |
| 2011/0235244 | A1* | 9/2011 | Mills ..................... H02B 1/056 |
| | | | 361/656 |
| 2012/0327592 | A1* | 12/2012 | Godrich et al. ......... 361/679.48 |

OTHER PUBLICATIONS

International Search Report filed in PCT/US2014/064062 mailed Feb. 18, 2015.

* cited by examiner

THERMALLY MANAGED LOAD MODULE WITH EMBEDDED CONDUCTORS

CROSS REFERENCE TO RELATED APPLICATION

This application claims priority to U.S. Provisional Application Ser. No. 61/899,995, filed Nov. 5, 2013, entitled THERMALLY MANAGED LOAD MODULE WITH EMBEDDED CONDUCTORS. This application is also a continuation-in-part application of and claims priority to U.S. application Ser. No. 14/464,848 and PCT/US1451999, both filed Aug. 21, 2014, entitled POWER MODULE, and which claim priority to U.S. Provisional Application Ser. No. 61/870,420, filed Aug. 27, 2013, entitled POWER MODULE. All of the aforementioned applications are herein incorporated by reference.

BACKGROUND OF THE INVENTION

Field of the Invention

The disclosed and claimed concept relates to power modules for aircraft and, more specifically, to a power module including a load module with an epoxy body and a number of conductive strands disposed therein.

Background Information

Power modules for aircraft, such as, but not limited to, a power module including a number of circuit breakers, should be small and robust. Known power modules utilize point to point wiring. There are disadvantages to this configuration. For example, wiring occupies space and increases the volume required for the power module. Further, wiring vibrates causing the wires to rub against each other and wear. It also takes time to assemble a power module that utilizes wires as each wire must be attached individually. Further, power modules are generally made from lighter materials. These materials, however, tend to be less robust and the power module cannot act as a load bearing element.

Point to point wiring is useful, however, in the load module. That is, for example, copper and aluminum aircraft wiring has a thermally and electrically insulative extruded sleeve surrounding the conductor. The insulation, however, traps and contains the heat which is not effectively dissipated.

There is therefore a need for a load module that dissipates heat generated by the conductors therein.

SUMMARY

According to one aspect, a load module for a power module in which the power module includes a housing assembly. The load module includes an epoxy body and a number of elongated conductive strands. Each of the conductive strand are partially disposed in the epoxy body and each of the conductive strands includes a conductive member and a limited insulator. Each of the limited insulators is disposed on selected portions of an associated conductive member.

According to another aspect, a power module includes a housing assembly that defines an enclosed space, and a load module. The load module is disposed in the housing assembly. The load module includes an epoxy body and a number of elongated conductive strands. Each of the conductive strands is partially disposed in the epoxy body and each the conductive strands includes a conductive member and a limited insulator. Each of the limited insulators is disposed on selected portions of an associated conductive member.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

It will be appreciated that the specific elements illustrated in the figures herein and described in the following specification are simply exemplary embodiments of the disclosed concept, which are provided as non-limiting examples solely for the purpose of illustration. Therefore, specific dimensions, orientations and other physical characteristics related to the embodiments disclosed herein are not to be considered limiting on the scope of the disclosed concept.

Directional phrases used herein, such as, for example, clockwise, counterclockwise, left, right, top, bottom, upwards, downwards and derivatives thereof, relate to the orientation of the elements shown in the drawings and are not limiting upon the claims unless expressly recited therein.

As used herein, the singular form of "a," "an," and "the" include plural references unless the context clearly dictates otherwise.

As used herein, the statement that two or more parts or components are "coupled" shall mean that the parts are joined or operate together either directly or indirectly, i.e., through one or more intermediate parts or components, so long as a link occurs. As used herein, "directly coupled" means that two elements are directly in contact with each other. As used herein, "fixedly coupled" or "fixed" means that two components are coupled so as to move as one while maintaining a constant orientation relative to each other. Accordingly, when two elements are coupled, all portions of those elements are coupled. A description, however, of a specific portion of a first element being coupled to a second element, e.g., an axle first end being coupled to a first wheel, means that the specific portion of the first element is disposed closer to the second element than the other portions thereof.

As used herein, the statement that two or more parts or components "engage" one another shall mean that the elements exert a force or bias against one another either directly or through one or more intermediate elements or components.

As used herein, the word "unitary" means a component is created as a single piece or unit. That is, a component that includes pieces that are created separately and then coupled together as a unit is not a "unitary" component or body.

As used herein, the term "number" shall mean one or an integer greater than one (i.e., a plurality).

As used herein, a "coupling assembly" includes two or more couplings or coupling components. The components of a coupling or coupling assembly are generally not part of the same element or other component. As such the components of a "coupling assembly" may not be described at the same time in the following description.

As used herein, a "coupling" or "coupling component(s)" is one or more component(s) of a coupling assembly. That is, a coupling assembly includes at least two components that are structured to be coupled together. It is understood that the components of a coupling assembly are compatible with each other. For example, in a coupling assembly, if one coupling component is a snap socket, the other coupling component is a snap plug, or, if one coupling component is a bolt, then the other coupling component is a nut.

As used herein, "associated" means that the elements are part of the same assembly and/or operate together, or, act upon/with each other in some manner. For example, an automobile has four tires and four hub caps. While all the elements are coupled as part of the automobile, it is understood that each hubcap is "associated" with a specific tire.

As used herein, "correspond" indicates that two structural components are sized and shaped to be similar to each other and may be coupled with a minimum amount of friction. Thus, an opening which "corresponds" to a member is sized slightly larger than the member so that the member may pass through the opening with a minimum amount of friction. This definition is modified if the two components are said to fit "snugly" together or "snuggly correspond." In that situation, the difference between the size of the components is even smaller whereby the amount of friction increases. If the element defining the opening and/or the component inserted into the opening are made from a deformable or compressible material, the opening may even be slightly smaller than the component being inserted into the opening. This definition is further modified if the two components are said to "substantially correspond." "Substantially correspond" means that the size of the opening is very close to the size of the element inserted therein; that is, not so close as to cause substantial friction, as with a snug fit, but with more contact and friction than a "corresponding fit," i.e., a "slightly larger" fit.

As used herein, "structured to [verb]" means that the identified element or assembly has a structure that is shaped, sized, disposed, coupled and/or configured to perform the identified verb. For example, a member that is "structured to move" is movably coupled to another element and includes elements that cause the member to move or the member is otherwise configured to move in response to other elements or assemblies.

As used herein, a "feeder layer" is a construct including a generally planar, non-conductive body with a number of conductive buses disposed therein. Such embedded conductive buses are protected and are resistant to wear and tear from vibration and other forces. The "feeder layer" further includes a number of conductive coupling components that are in electrical communication with the conductive bus(es). The conductive coupling components include, but are not limited to, a conductive pin that extends through, and generally perpendicular to, the non-conductive body, or, a passage that extends through, and generally perpendicular to, the non-conductive body as well as the conductive bus(es).

As used herein, a "conductive strand" includes wires and similar constructs having a conductive member disposed in an insulator. A "conductive strand" does not include bus bars embedded in a thermally conductive polymer. Further, it is understood that a "conductive strand" does not include an insulator at the ends.

As used herein, a "thermally conductive material" includes materials structured to absorb or conduct heat, such as, but not limited to, Circalok™ 6037A (epoxy adhesive)/6252B (hardener) manufactured by Lord Corporation, 111 Lord Drive, Cary, N.C. 27511 USA. As noted hereinabove, the thermally conductive material can include an epoxy adhesive and hardener. The epoxy adhesive can be formulated for use by the semiconductor industry and is an easy-to-spread thixotropic paste that offers high heat transfer, low shrinkage, and a coefficient of thermal expansion comparable to that of copper and aluminum. The epoxy adhesive has a strong bond to a wide variety of substrates, resists severe temperature cycling, and can be used to form thermally conductive joints in fabricated heat sinks and between heat sinks and power devices. When used to bond semiconductors to heat sinks, the epoxy adhesive also serves as an electrical insulator, but the semiconductor's mating surfaces should be precoated and allowed to cure to insure the dielectric integrity of the epoxy interface.

When the epoxy adhesive is mixed with the hardener, the resulting thermally conductive material can have the following physical properties in Table 'A'.

TABLE 'A'

| | |
|---|---|
| Tensile Strength @ 25° C., psi | 9,400 |
| Tensile Elongation, % @ yield | 4.1% |
| Compressive Strength @ 25° C., psi | 16,000 |
| Glass Transition Temperature ° C. | 70 |
| Water Absorption, 10 days @ 25° C., % | 0.17 |
| Hardness Shore D | 92 |
| Bond Shear Strength, Al to Al 1" overlap, psi | 1,500 mm. |
| Thermal Conductivity, | 1.1 W/mk |
| CTE, in/in ° C. × $10^{-6}$ | 31 |
| Volume Resistivity @ 25° C., Ohm-cm | $>10^{15}$ |
| Dielectric Strength, volts/mil | 400 volts min. |

The hardener can be resilient, resistant to thermal shock, have very low viscosity, good air release, medium pot life, and a moderately fast cure. Further, the hardener can have a room temperature cure, but moderate heat may be used to accelerate cure.

Listed below in Table 'B' is a cure schedule.

TABLE 'B'

| Parts by Weight Per 100 Parts Resin | Pot Life 100 grams @ 25° C. (77° F.) | Cure Time 25° C. (77° F.) | Cure Time 65° C. (149° F.) | Cure time 100° C. (212° F.) | Cure Time 130° C. (266° F.) |
|---|---|---|---|---|---|
| 7.1 | 3 hours | 24 hours | 2 hours | — | — |

With regard to handling, as is known in the art, the epoxy adhesive and the hardener are mixed thoroughly together, preferably with power equipment. Then, the epoxy adhesive and hardener mixture can be applied to both mating surfaces and the mating surfaces are pressed together, squeezing out excess resin to obtain a thin glue line. Additionally, the mating surfaces can be clamped together to prevent movement during curing.

Any adhesive, regardless of the type, can only be expected to perform well on a properly prepared surface. Some surfaces require little or no preparation and epoxies will cling to them tenaciously. Other materials such as Teflon or polyethylene are very resistant to bonding even with the best preparation methods known. In the middle of the spectrum, however, are materials, which can be bonded successfully with proper treatment. These would include all types of metals, many plastics, glass and ceramics.

In order to properly understand bond strengths, the user should be familiar with the difference between adhesive and cohesive failures. Assume that two pieces of metal are partially overlapped and joined by a thin bond of adhesive. Now, the specimen is placed in a machine designed to pull it apart lengthwise. The stress applied is known as "shear". The point at which the specimen breaks across the bond line is known as its "Tensile Shear Strength" and is usually expressed in pounds per square inch. By examining the bond line on the two pieces, there should be roughly equal amount of cured adhesive left on both pieces. This ideal condition is known as a "cohesive break". However, if no adhesive is left on one of the pieces (or very little adhesive), this is known as an "adhesive break" and is indicative of either poor surface preparation, the wrong adhesive, a non-receptive surface or a combinations of these factors. The major hindrances to adhesion are dust, dirt, grease, corrosion, oxidation and scale.

In addition, smooth, nonporous surfaces generally provide poor bonds. Metals, plastics, and glass may need to be artificially roughed-up to provide a good bond. Also, materials containing polyolefins or fluorocarbons may require some type of special pre-treatment prior to bonding. For proper bonding, any adhesive must adequately wet the surfaces. Therefore, proper cleaning should also be considered.

The two most important aspects of surface preparation prior to adhesive bonding are: proper cleaning and proper physical conditioning. Described hereinbelow are a number of materials commonly encountered in adhesive bonding and a general description of the preparation methods commonly employed.

Most plastics to be bonded have a smooth surface. Therefore, particular attention should be paid to roughing or etching the surface in addition to a good solvent cleaning. Some plastics, such as polyethylene, may require special types of treatment.

With metals, two common methods of surface preparation are generally used. These include degreasing followed by treatment by or grit blasting, grinding, sanding or honing; and chemical cleaning by one or a combination of the following methods: degreasing with chlorinated or ketone solvents, alkaline cleaning, and acid etching.

With glass, the surface is typically prepared by solvent wiping and, where possible, sand blasting to improve mechanical bond.

Fired, unglazed ceramics generally require no preparation as long as they are clean. Glazed ceramics should be roughed-up by sanding.

The methods listed above are very general in nature. There is considerable published information available covering surface preparation in detail. For example, the American Society for Testing and Materials publishes recommended practices such as:

ASTM D 2093 Preparation of Surfaces of Plastics Prior to Adhesive Bonding

ASTM 2651 Preparation of Metal Surfaces for Adhesive Bonding Complete publications listings are available from ASTM at 1916 Race Street, Philadelphia, Pa. 19103.

In summary, achieving successful adhesive bonding may be increased by: considering the nature of the application and understand the problems associated with adhesive bonding, conducting thorough suitability testing, selecting the proper adhesive, and preparing the surfaces property.

Figure 1:
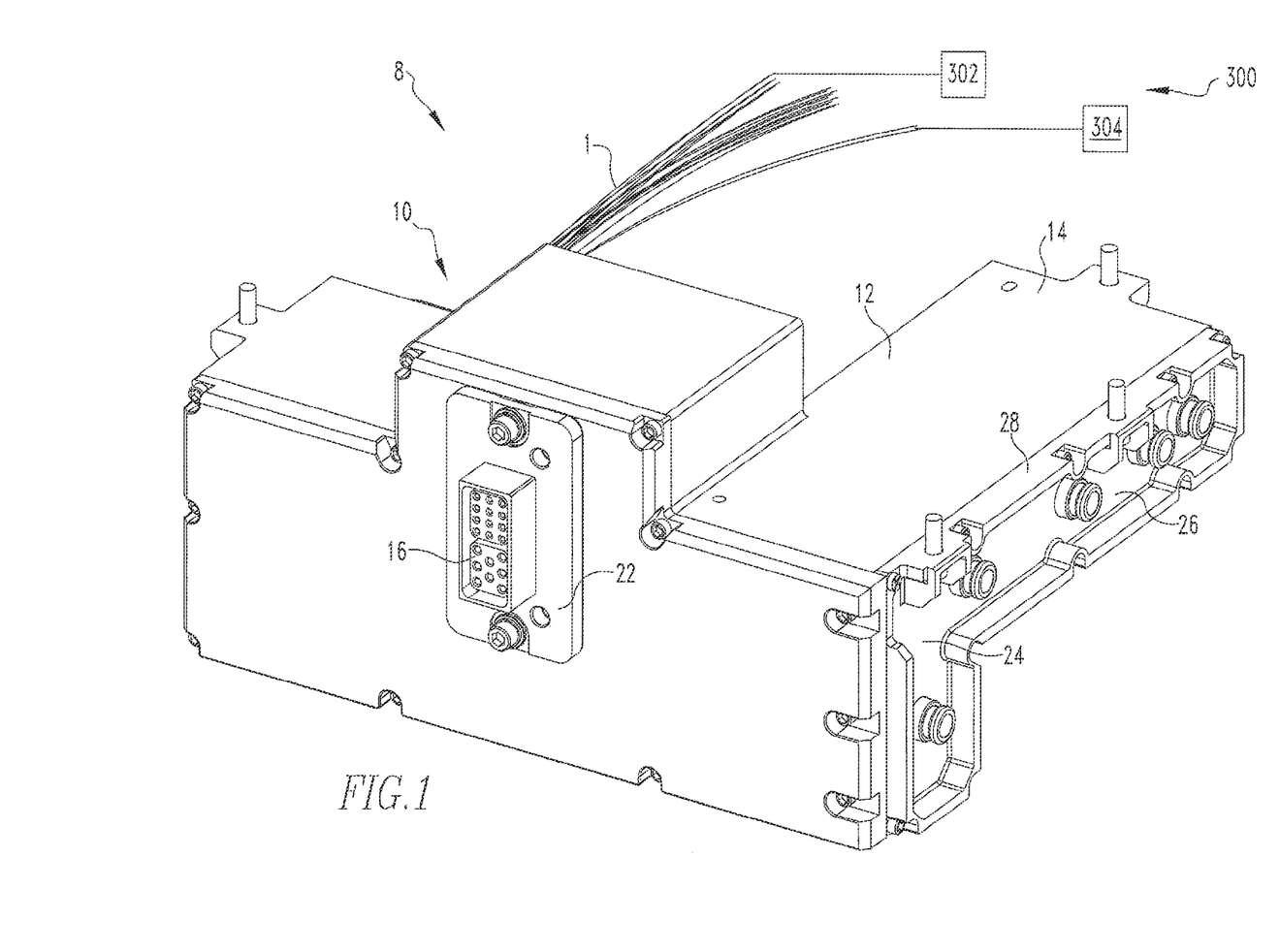
FIG. 1 is an isometric view of a power module in an electrical system.
Figure 4:
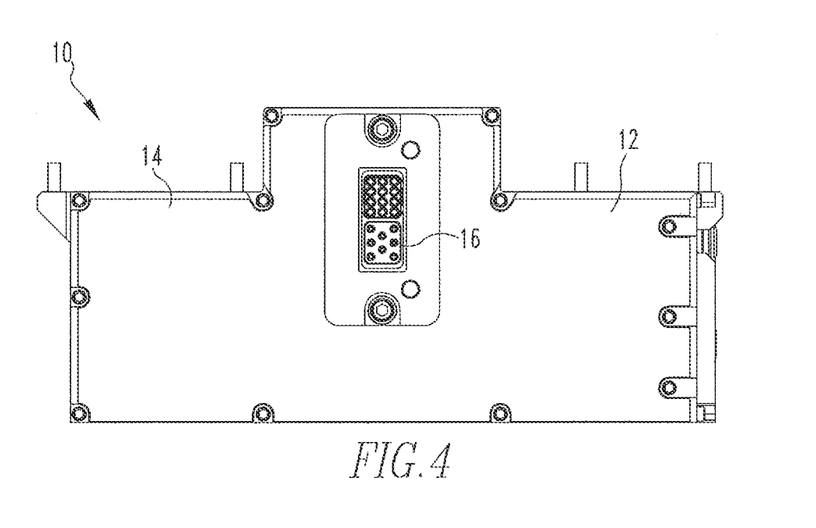
FIG. 4 is a front view of a power module.
Figure 5:
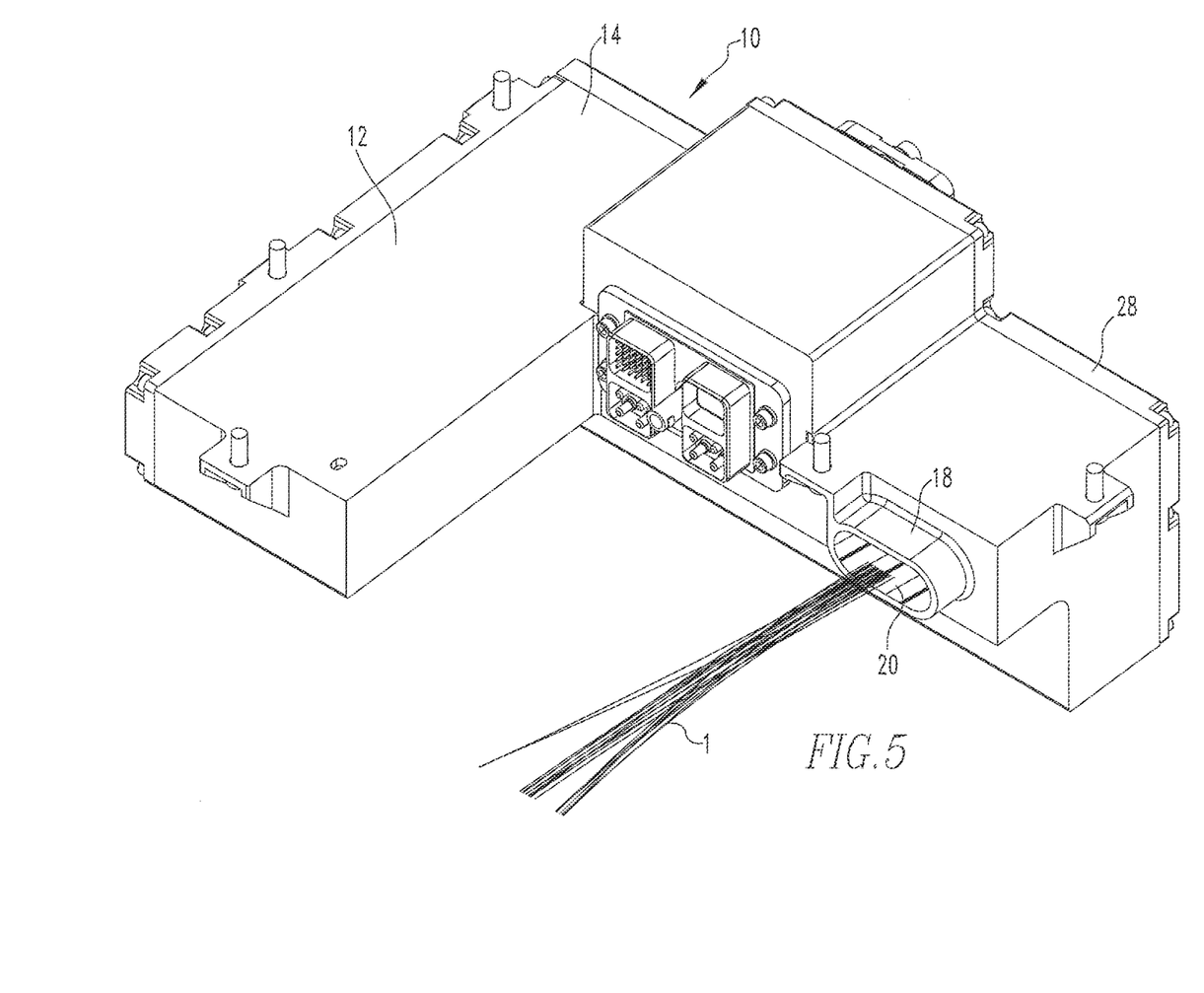
FIG. 5 is another isometric view of a power module.
Figure 6:
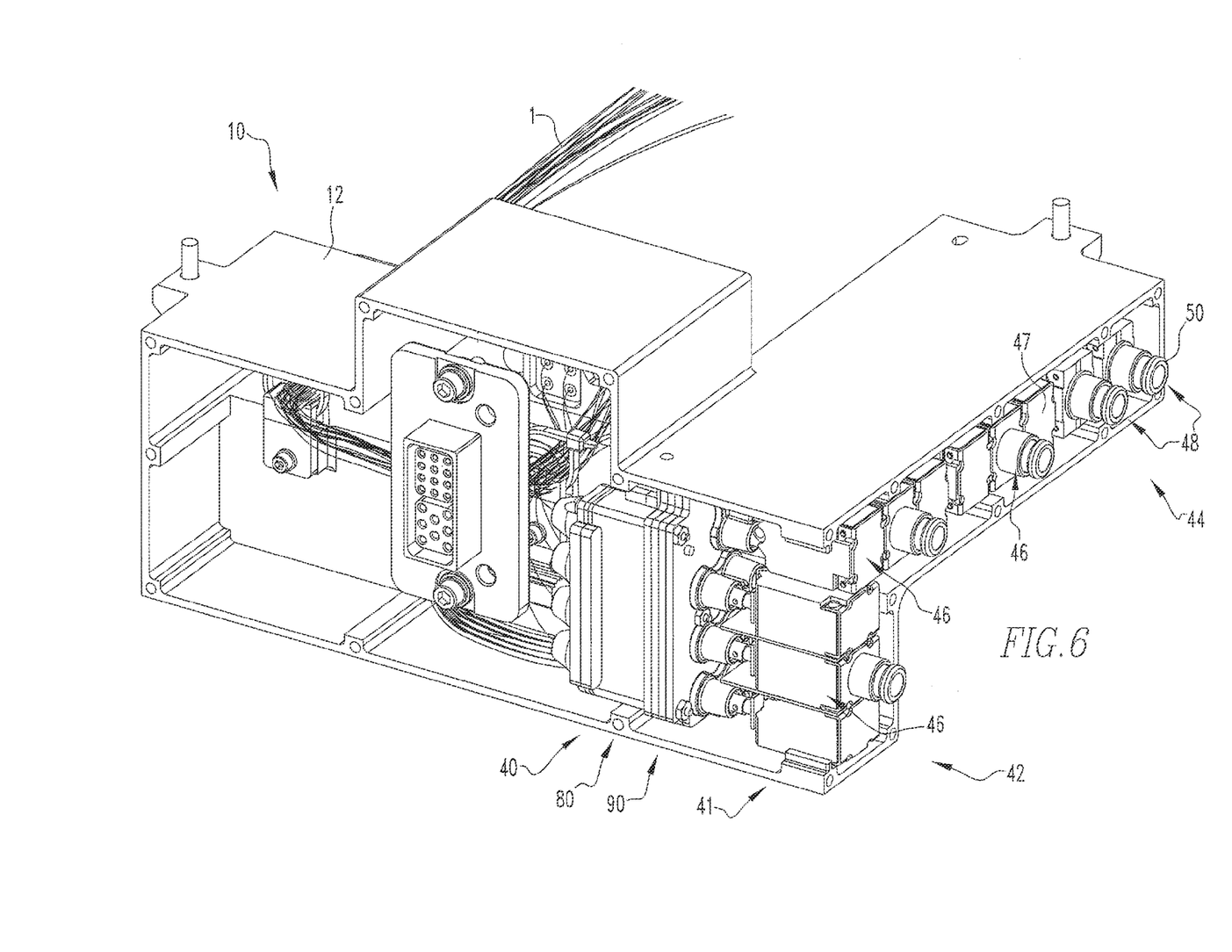
FIG. 6 is another isometric view of a power module with selected housing assembly sidewalls removed.

As shown in FIG. 1, an electrical system 8 includes a power module 10. As shown in FIGS. 1-5, the power module 10 includes a housing assembly 12 as well as an electrical assembly 40 (FIG. 6). The housing assembly 12 includes a number of generally planar sidewalls 14 and defines an enclosed space 15. In an exemplary embodiment, the sidewalls 14 are made from aluminum or titanium. In this configuration, the housing assembly 12 acts as a load bearing unit. That is, as used herein, a "load bearing unit" is an element that is capable of supporting a load of 150 lbs or more, and which is coupled to other elements so as to transfer a significant load. It is noted that, as used herein, a power module utilizing a flexible harness does not transfer a significant load.

The housing assembly 12 also includes a number of electrical ports 16. In an exemplary embodiment, each electrical port 16 includes a collar 18 extending about an electrical coupling component. If the electrical coupling is between wires 1 and the electrical port 16, as shown in FIG. 5, then the space defined by the collar 18 is, in an exemplary embodiment, filled with an epoxy 20. The epoxy 20 reduces the strain on the wires 1. As shown in FIG. 4, an electrical port 16 includes a support plate 22. The support plate 22 supports side loading. That is, the support plate 22 includes a flange about the electrical port 16 as well as bearings/holes to accept mating with another unit, such as but not limited to an ECU.

Figure 2:
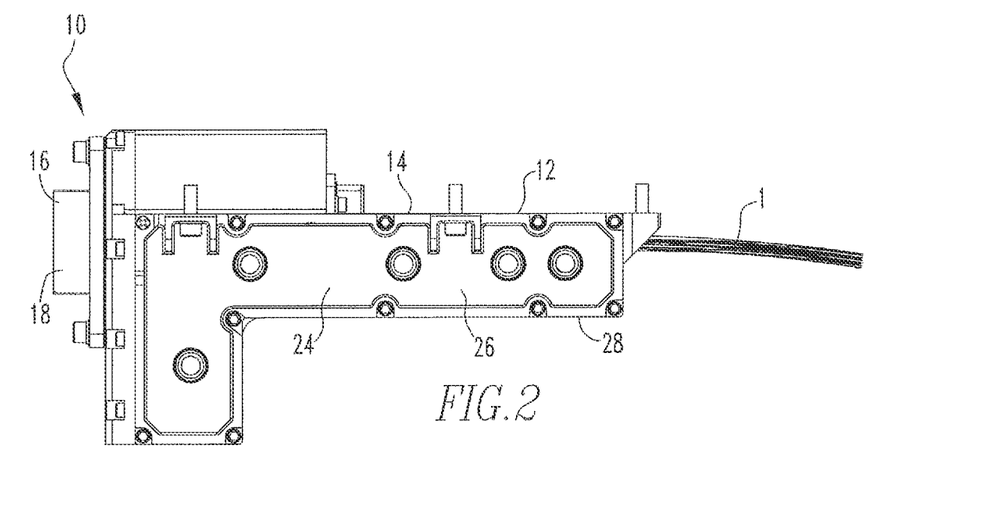
FIG. 2 is a side view of a power module.
Figure 3:
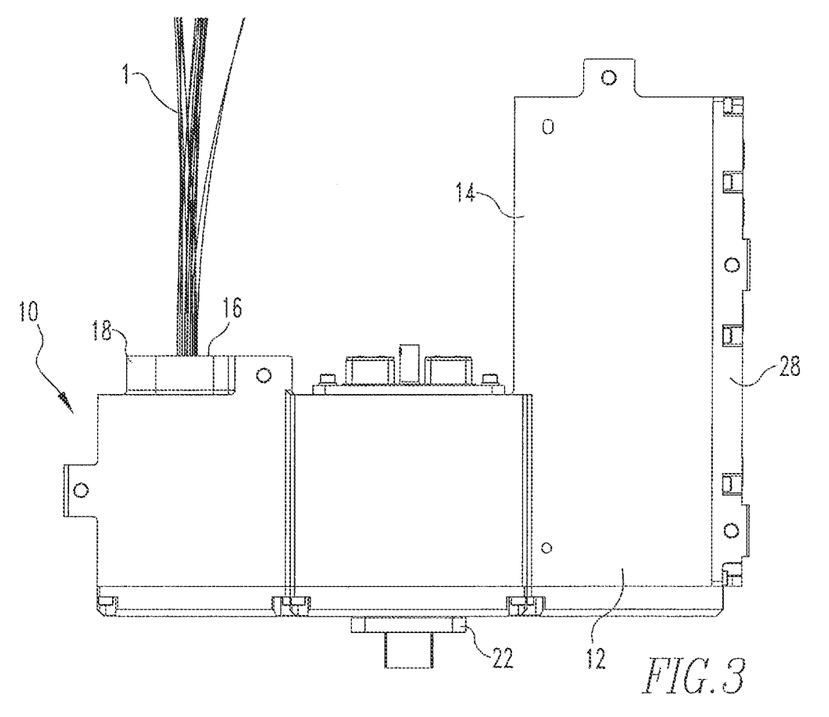
FIG. 3 is a top view of a power module.

Further, the housing assembly 12 also includes a selectively coupled, i.e. removable, face plate 24 (FIGS. 1 and 2). The face plate 24 is a generally planar member 26 including a number of openings (not shown) that, in an exemplary embodiment, correspond to circuit breaker actuator buttons 50. The face plate 24 further includes a generally perpendicular flange 28 extending thereabout. The face plate flange 28 further enhances the rigidity of the housing assembly 12 and, effectively, makes the face plate 24 a recessed face plate 24. In this configuration, the circuit breaker actuator buttons 50 are protected.

As shown in FIGS. 6-10, the electrical assembly 40 includes a number of electrical components 41, an input assembly 60, a number of AC feeder layers 80, a number of DC feeder layers 90, and a number of conductive coupling components 100. The number of electrical components 41 includes a number of AC electrical components 42 and a number of DC electrical components 44. In an exemplary embodiment, the AC electrical components 42 and the DC electrical components 44 include a number of miniature circuit breakers 46, 48 respectively. Circuit breakers 46 are AC circuit breakers and circuit breakers 48 are DC circuit breakers. As is known, the circuit breakers 46, 48 include an actuator button 50, an operating mechanism and trip assembly (neither shown) as well as a number of line and load conductive coupling components 52, 54 (respectively) (FIGS. 8-10)). In an exemplary embodiment, the circuit breaker conductive coupling components 52, 54 are sockets and, in an exemplary embodiment as shown, each circuit breaker includes a line socket 55 (FIG. 10) and a load socket (not shown). Further, in an exemplary embodiment, the AC circuit breakers 46 are three-phase circuit breakers that include a line socket 55 and a load socket for each phase. That is, each AC circuit breaker 46 includes three line sockets 55 and three load sockets.

Figure 7:
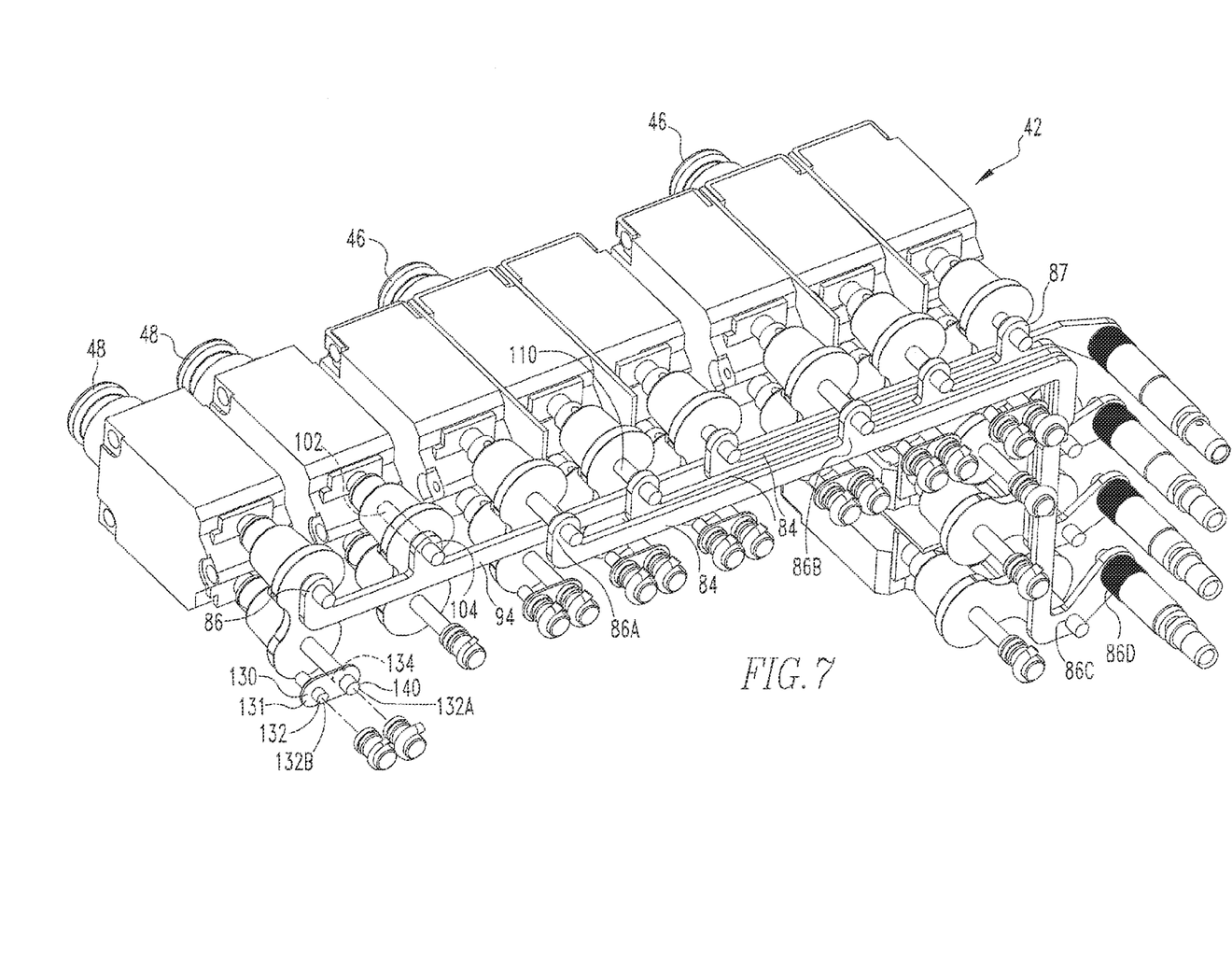
FIG. 7 is a partial isometric view of an electrical assembly.
Figure 8:
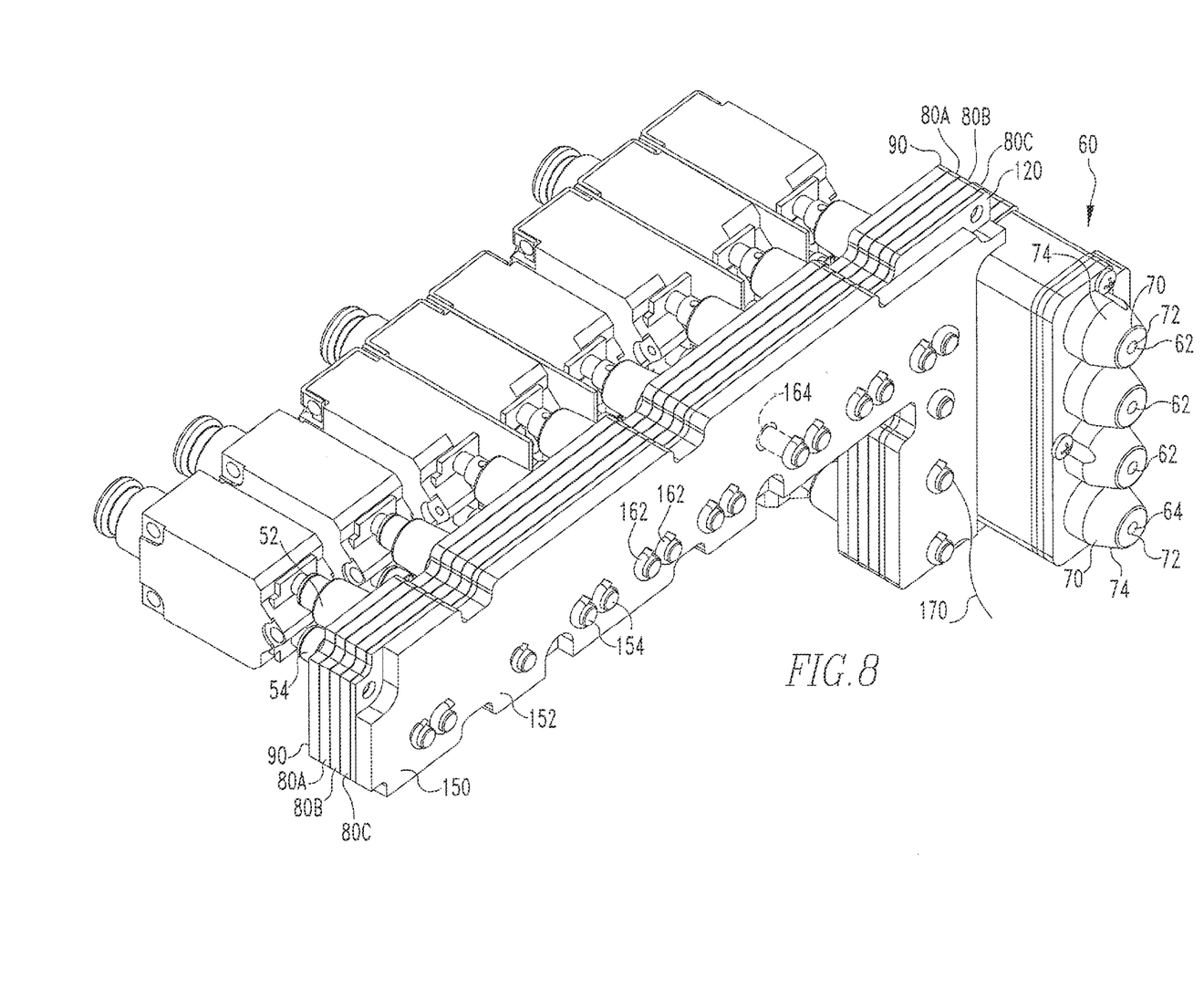
FIG. 8 is another partial isometric view of an electrical assembly.
Figure 9:
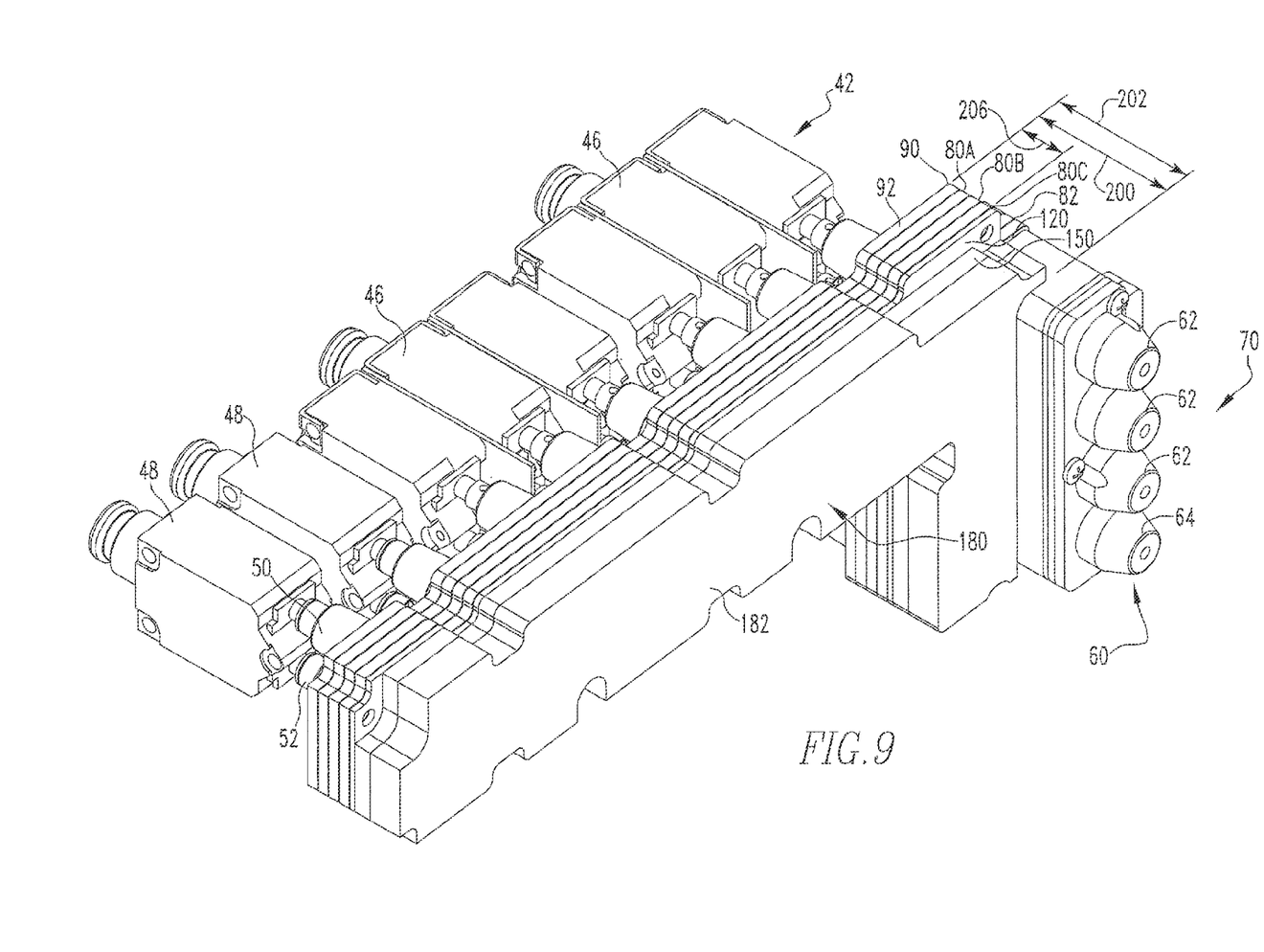
FIG. 9 is another partial isometric view of an electrical assembly.

As shown in FIG. 7-9, the input assembly 60, in an exemplary embodiment, includes an AC input assembly 62 and a DC input assembly 64. Each of the AC input assembly 62 and the DC input assembly 64 include a number of input ports 70 which are substantially similar and only one will be described. An input port 70 includes two conductive coupling components. That is, each input port 70 includes an elongated conductor (not shown) including a first end (not shown) and a second end (not shown). The input port first end defines a socket 72 and the input port second end is a pin. The input port first end is, in an exemplary embodiment, disposed within a non-conductive collar 74.

As shown in FIGS. 7 and 9, each AC feeder layer 80 is substantially similar and are described generally. An AC feeder layer 80 includes a generally planar body 82 (FIG. 9) and an embedded conductor 84 (FIG. 7). The AC feeder layer body 82 is non-conductive. The AC feeder layer body 82 has a thickness of between about 0.040 inch and 0.080 inch or about 0.060 inch. The AC feeder layer embedded conductor 84 is elongated and includes a number of conductive coupling components 86A, 86B, 86C, 86D (or generally reference number 86). In an exemplary embodiment, a conductive coupling component 86 is an opening in a tab 87 offset from the longitudinal axis of the embedded conductor 84. In an exemplary embodiment, each AC feeder layer conductive coupling component 86A, 86B, 86C, 86D is an opening that corresponds to another conductive coupling component. For example, as shown, one AC feeder layer conductive coupling component 86A corresponds to an input port second end pin. Thus, when an input port second end pin is disposed in the AC feeder layer conductive coupling component 86A, the input port 70 is coupled to, and in electrical communication with, the AC feeder layer embedded conductor 84. It is noted that the shape of the AC feeder layer embedded conductor 84 and the locations of the AC feeder layer conductive coupling component 86A, 86B, 86C, 86D are configured to correspond to the number of AC electrical components 42 that are coupled thereto. As noted above, in an exemplary embodiment, the AC circuit breakers 46 are three-phase circuit breakers. Accordingly, there are three AC feeder layers 80; a first AC feeder layer 80A, a second AC feeder layer 80B, and a third AC feeder layer 80C. Each of the AC feeder layer bodies 82 have a substantially similar shape. As shown, the shape of the AC feeder layer bodies 82 is generally "L" shaped.

Each DC feeder layer 90 is substantially similar and are described generally. A DC feeder layer 90 includes a generally planar body 92 and an embedded conductor 94. The DC feeder layer body 92 is non-conductive. The DC feeder layer body 92 has a thickness of between about 0.040 inch and 0.080 inch or about 0.060 inch. The DC feeder layer embedded conductor 94 is elongated and includes a number of conductive coupling components (not shown). As with the AC feeder layer embedded conductor 84, the DC feeder layer embedded conductor 94 conductive coupling components are, in an exemplary embodiment, openings that correspond to another conductive coupling component. In an exemplary embodiment, there is a single DC feeder layer 90A. The DC feeder layer body 92 has a shape that substantially corresponds to the shape of the AC feeder layer bodies 82.

The electrical assembly number of conductive coupling components 100 includes external coupling components 102 and internal coupling components 104. The external coupling components 102 are structured to have electrical components 42, such as, but not limited to, miniature circuit breakers 46, 48 coupled thereto. The external coupling components 102 are generally the same and only one will be described. In an exemplary embodiment, the conductive coupling components 100 are elongated pins 110 that include a first end 112, a medial portion 114 and a second end 116. The pins 110 are oriented so that the longitudinal axis thereof extends generally perpendicular to the plane of the AC and the DC feeder layer bodies 82, 92. The external coupling components 102 are disposed at the pin first ends 112.

Figure 10:
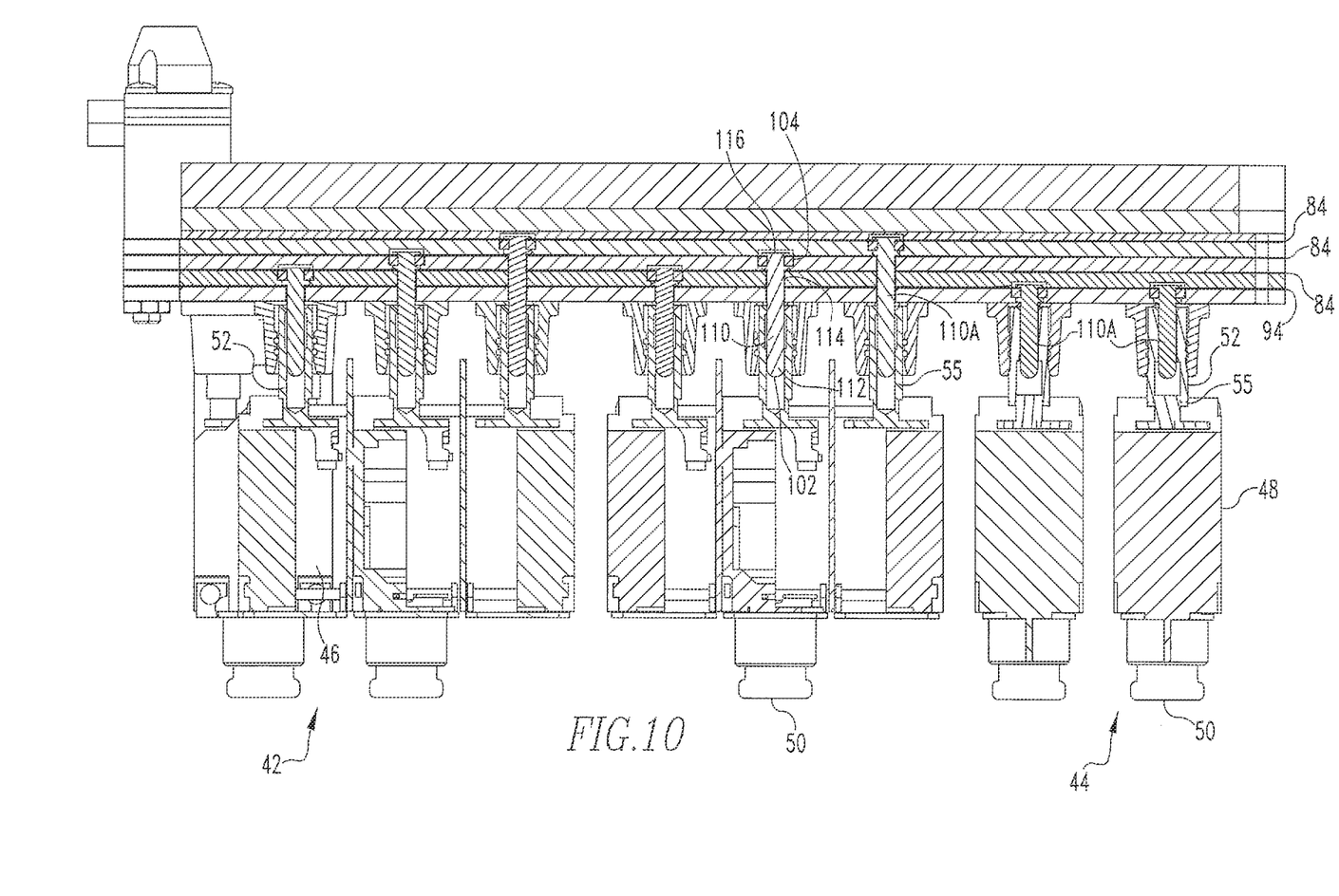
FIG. 10 is another partial isometric view of an electrical assembly showing the conductive elements.

That is, in an exemplary embodiment, as shown in FIG. 10, each external coupling component 102 is a pin first end 112 that corresponds to a circuit breaker socket. Further, for each circuit breaker 46, 48 there is a load pin 110A and a line pin 110B corresponding to each circuit breaker line socket and load socket. Thus, each external coupling component 102, i.e. each pin first end 112, is structured to be, and is, coupled to and in electric communication with either an AC electrical component 42 or a DC electrical component 44.

The internal coupling components 104 include both the pin medial portions 114 and the pin second ends 116. For example, each pin medial portion 114 corresponds to an AC or DC feeder layer conductive coupling component 86. That is, in an exemplary embodiment, each pin medial portion 114 substantially corresponds, or snuggly corresponds, to the size of the AC or DC feeder layer conductive coupling component 86. Each pin medial portion 114 extends through, and is electrical communication with, the associated AC or DC feeder layer conductive coupling component 86, the "associated" AC or DC feeder layer conductive coupling component 86 is the AC or DC feeder layer conductive coupling component 86 through which the external coupling component pin medial portion 114 extends. In an exemplary embodiment, each pin second end 116 extends through the various AC and the DC feeder layer bodies 82, 92 and is coupled to a splitter element second coupling component, as discussed below. In another exemplary embodiment, not shown, each pin second end 116 extends through the various AC and the DC feeder layer bodies 82, 92 and forms a terminal similar to the terminal elements 154 discussed below.

In an exemplary embodiment, as shown in FIGS. 7 and 9, the electrical assembly 40 further includes a number of splitter layers 120. Each splitter layer 120 includes a body 122 (FIG. 9) and a number of splitter elements 124 (FIG. 7). The splitter layer body 122 has a thickness of between about 0.040 inch and 0.080 inch or about 0.060 inch. The splitter layer body 122 has a shape that substantially corresponds to the shape of the AC feeder layer bodies 82. Each splitter element 124 includes a conductive body 130. Each splitter element body 130 includes a generally planar member 131, plurality of conductive first coupling components 132 and a single conductive second coupling component 134. In an exemplary embodiment, the splitter element body second coupling component 134 is a socket (not shown) that corresponds to a pin second end 116. Thus, when a splitter layer body 122 is stacked on the AC and the DC feeder layer bodies 82, 92, a pin second end 116 is disposed in, and in electrical communication with, the splitter element body second coupling component 134. In an exemplary embodiment, each splitter element body first coupling component 132 is a lug 140 extending from the splitter element body planar member 131 on a side of the splitter element body planar member 131 opposite the splitter element body second coupling component 134. In an exemplary embodiment, there are two splitter element body first coupling components 132; a primary first coupling component 132A and a secondary first coupling component 132B. The primary first coupling component 132A and the secondary first coupling component 132B are in electric communication with each other. In an exemplary embodiment, not shown, each splitter element body first coupling component 132 is a terminal as described below. Further, as shown, the splitter layer body 122, in an exemplary embodiment, also includes a number of passages that allow a pin second end 116 to extend therethrough.

In an exemplary embodiment, and as shown in FIG. 8, the electrical assembly 40 further includes a number of terminal layers 150. In an exemplary embodiment, there is one terminal layer 150. The terminal layer 150 includes a body 152 and a number of terminal elements 154. The terminal layer body 152 has a thickness of between about 0.040 inch and 0.080 inch or about 0.060 inch. The terminal layer body 152 has a shape that substantially corresponds to the shape of the AC feeder layer bodies 82. The terminal elements 154 include conductive bodies 160 that extend through the terminal layer body 152. The terminal element bodies 160 each include a conductive first coupling component 162 and a conductive second coupling component 164, hereinafter "terminal element conductive first coupling component 162" and "terminal element conductive second coupling component 164." As shown, in an exemplary embodiment, the terminal element conductive first coupling component 162 is a generally circular terminal 166 about which a wire 170 may be wrapped. The terminal element conductive second coupling component 164, in an exemplary embodiment, is a socket sized to correspond to a splitter body lug 140.

In an exemplary embodiment, the electrical assembly 40 further includes a cover layer 180, as shown in FIG. 9. The cover layer 180 includes a body 152. The cover layer body 152 is substantially hollow and open on one planar side. The cover layer body 152 has a thickness of between about 0.040 inch and 0.080 inch or about 0.060 inch. The cover layer body 182 has a shape that substantially corresponds to the shape of the AC feeder layer bodies 82. The cover layer 180 is structured to enclose the wires 170 coupled to the terminal layer 150

The various layers discussed above are assembled in a stack 200. That is, as used herein a "stack" is a number of generally planar elements disposed with the planes substantially parallel to each other and with each element disposed adjacent another element. The "stack" may include other elements such as, but not limited to coatings or adhesives. In an exemplary embodiment, the stack 200 is a direct contact stack 202 wherein, as used herein, a "direct contact stack" is a number of generally planar elements disposed with the planes substantially parallel to each other and with each element disposed immediately adjacent another element and directly coupled thereto. In either a stack 200 or a direct contact stack 202 the measurement of the thickness does not include the perpendicular conductive coupling components 100.

As shown in FIG. 9, a conductive stack 206 includes only the AC feeder layers 80 and the DC feeder layers 90. In an exemplary embodiment, as noted above, there are three AC feeder layers 80A, 80B, and 80C and a single DC feeder layer 90A. The conductive stack 206 has a thickness of between about 0.250 inch and 0.320 inch or about 0.285 inch. The conductive stack 206 is either a stack 200 or a direct contact stack 202.

A stack that includes layers other than the AC feeder layers 80 and the DC feeder layers 90 is identified by the broader, general term stack 200, or direct contact stack 202, as defined above, an exemplary embodiment, a stack 200, or direct contact stack 202, includes the AC feeder layers 80, the DC feeder layers 90, the splitter layers 120, the terminal layers 150, and the cover layer 180. In an exemplary embodiment, as noted above, there are three AC feeder layers 80A, 80B, and 80C and a single DC feeder layer 90A as well as a single splitter layer 120, a single terminal layer 150 and a single cover layer 180. The stack 200, or direct contact stack 202, has a thickness of between about 0.250 inch and 0.620 inch or about 0.435 inch.

The electrical system 8 includes a number of other electrical devices 300 (shown schematically). In use, the power module 10 is coupled to, and in electrical communication with, such electrical devices 300. A number of the electrical devices 300 are alternate use devices 302, 304. That is, as used herein, an "alternate use device" is one of a set of devices 300 wherein only one device 300 in the set is used at a time. As a non-limiting example, the alternate use devices 302, 304 are a first fuel pump and a second fuel pump. In operation, only one fuel pump is used at a time. In this configuration, the alternate use devices 302, 304, in an exemplary embodiment, share a single circuit breaker, e.g. an AC circuit breaker 46. The alternate use devices 302, 304 are coupled to, and in electrical communication with, an associated circuit breaker 46 or 48 via a splitter element 124. That is, a first alternate use device 302 is coupled to, and in electrical communication with, the primary first coupling component 132A, and, a second alternate use device 304 is coupled to, and in electrical communication with, the secondary first coupling component 132B. In view of the electric coupling described above, this means that, the first alternate use device 302 is coupled to a first circuit breaker 47 and the second alternate use device 304 is coupled to, and in electrical communication with, the first circuit breaker 47. In an exemplary embodiment, the selection of which alternate use device 302, 304 is in use occurs at a different control module. Stated alternatively, a number of the electrical components 41 are structured to be coupled to, and in electrical communication with, the first alternate use device 302 and the second alternate use device 304. Thus, by allowing alternate use devices 302, 304 to share a single circuit breaker 46, 48, the total number of circuit breakers 46, 48 is reduced. That is, by joining the load points on individual circuit breakers 46, 48, multiple loads can be powered from the same source, or, multiple loads can be powered from multiple sources, and more circuits can be protected with a reduced number of circuit breakers 46, 48 by controlling the loads with a controller (not shown).

Figure 11:
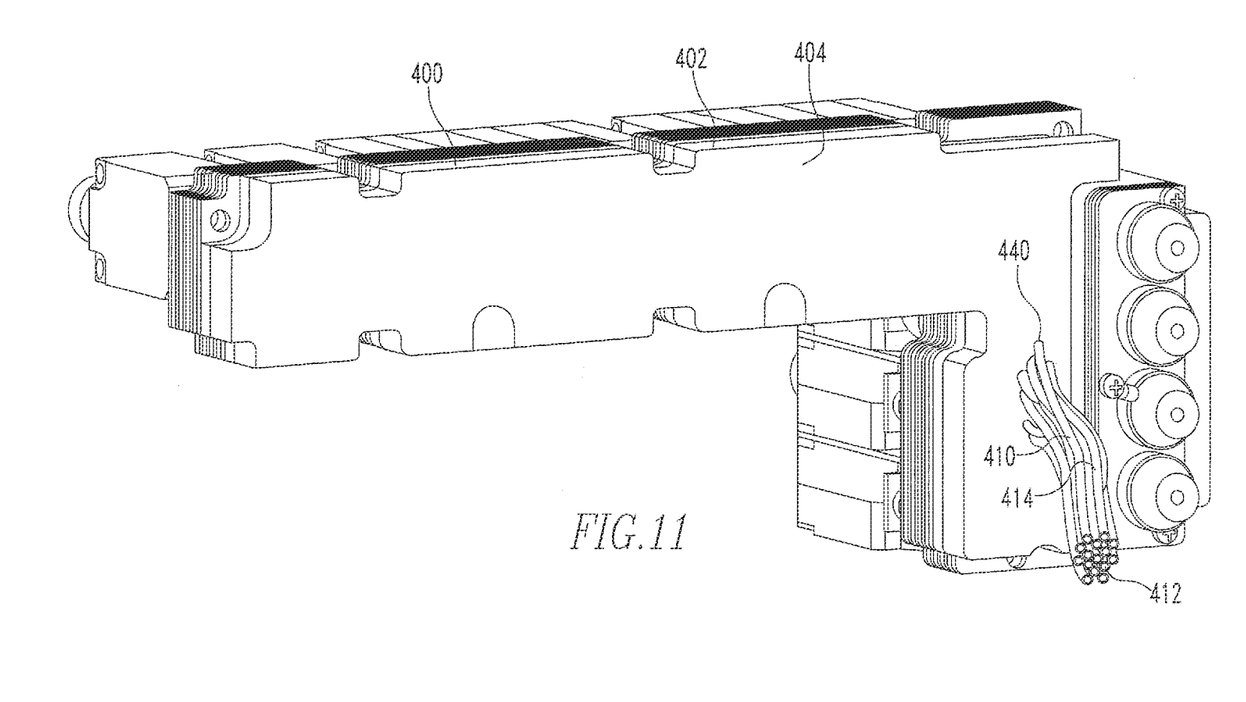
FIG. 11 is an isometric view of an alternate power module.
Figure 12:
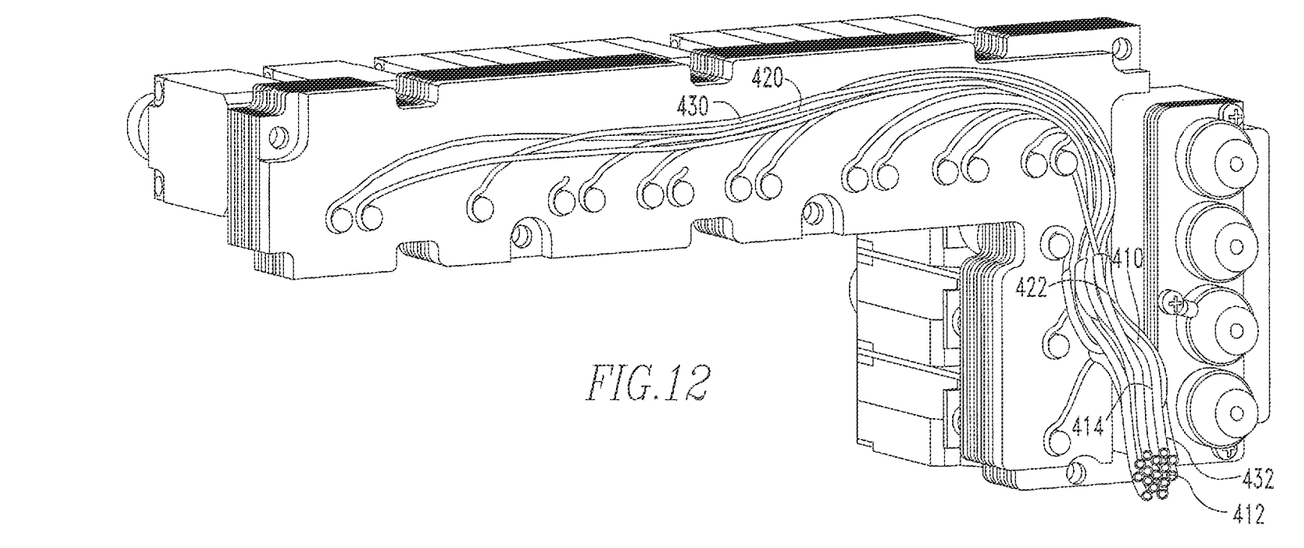
FIG. 12 is an isometric view of an alternate power module with the epoxy body removed.

In another exemplary embodiment, shown in FIGS. 11 and 12, the power module 10 does not include the cover layer 180 described above, but rather a load module 400. The load module 400 includes an epoxy body 402 and a number of elongated conductive strands 410. The epoxy body 402 is, in an exemplary embodiment, a generally planar, non-conductive body. As shown, in FIG. 11, the epoxy body 402 includes a planar outer surface 404. It is understood that the opposing planar surface is coupled, directly coupled or fixed to the next adjacent layer, as shown, a terminal layer 150. The epoxy body outer surface 404 is coupled, directly coupled or fixed to a housing assembly planar sidewall 14. In this configuration, the epoxy body 402 surface area in contact with the housing assembly 12 is substantially maximized. Further, the epoxy body 402 is, in an exemplary embodiment, made from a thermally conductive material. In this configuration, the epoxy body 402 is structured to transfer heat to the housing assembly 12.

The conductive strands 410 are substantially similar and only one will be described. Each conductive strand 410 includes a conductive member 412 and a limited insulator 414. As used herein, a "limited insulator" 414 is an insulator that is disposed on a number of selected portions of the associated conductive member 412. It is noted that lack of an insulator at the ends of a conductive strand 410 is typical and such an insulator is not a "limited insulator" as used herein. In an exemplary embodiment, not shown, the limited insulator 414 is an insulator disposed about an associated conductive member 412 in a pattern such as a checkered pattern. That is, the limited insulator 414 includes a number of opening therethrough.

In an exemplary embodiment, as shown, each limited insulator 414 is disposed on a limited continuous portion of each associated conductive member 412 whereby each conductive member 412 includes a number of bare portions 420 and a number of insulated portions 422. As shown, there is a single bare portion 420 and a single insulated portion 422.

When the load module 400 is assembled, each conductive strand 410 is partially disposed in the epoxy body 402. In this configuration, each conductive strand 410 includes an embedded portion 430 and an exposed portion 432. In an exemplary embodiment, each conductive strand bare portion 420 is substantially coextensive with each conductive strand embedded portion 430. In an exemplary embodiment, each conductive strand bare portion 420 is directly coupled to the epoxy body 402. It is understood that the conductive strand bare portions 420 are spaced from each other within the epoxy body 402. That is, the conductive strand bare portions 420 are not directly coupled to one another. In this configuration, each conductive strand bare portion 420 is electrically insulated within the epoxy body 402.

Further, in an exemplary embodiment, each conductive strand insulated portion 422 is substantially coextensive with each conductive strand exposed portion 432. As used herein, "substantially coextensive" does not mean that the identified portions are exactly coextensive. That is, in an exemplary embodiment, each conductive strand insulated portion 422 extends slightly into the epoxy body 402. That is, in a configuration wherein a conductive strand 410 is partially disposed in the epoxy body 402, the conductive strand 410 exits the epoxy body 402 at a conductive strand exit interface 440. Accordingly, in an exemplary embodiment, each conductive strand insulated portion 422 extends into the epoxy body 402 at each conductive strand exit interface 440.

In this configuration, each conductive strand 410 is structured to be, and is, coupled to and in electrical communication with a terminal element 154 as well as an electrical device 300. Moreover, because each conductive strand embedded portion 430 is disposed in the non-conductive epoxy body 402 and the each conductive strand exposed portion 432 includes the conductive strand insulated portion 422, each conductive strand 410 is electrically insulated over substantially its entire length. Further, because each conductive strand bare portion 420 is directly coupled to the epoxy body 402 each conductive strand 410 is thermally conductively coupled to the epoxy body 402.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A load module for a power module, said power module including a housing assembly, said load module including:
   an epoxy body;
   a number of elongated conductive strands;
   each said conductive strand partially disposed in said epoxy body;
   each said conductive strand including a conductive member and a limited insulator;
   wherein each said limited insulator is disposed on selected portions of an associated conductive member;
   wherein said epoxy body is a thermally conductive material; and
   wherein said epoxy body is directly coupled to said housing assembly.

2. The load module of claim 1 wherein:
   each said conductive strand is electrically insulated over substantially an entire length of each said conductive strand; and
   each said conductive strand is thermally conductively coupled to said epoxy body.

3. The load module of claim 1 wherein each said limited insulator disposed on a limited portion of each said conductive member whereby each said conductive member includes a number of bare portions and a number of insulated portions.

4. The load module of claim 3 wherein:
   each said conductive strand includes an embedded portion and an exposed portion;
   wherein each said conductive strand bare portion is substantially coextensive with each said conductive strand embedded portion;
   wherein each said conductive strand insulated portion is substantially coextensive with each said conductive strand exposed portion; and
   wherein each said conductive strand bare portion is directly coupled to said epoxy body.

5. The load module of claim 4 wherein:
   each said conductive strand includes an exit interface disposed at a surface of said epoxy body; and
   wherein each said conductive strand insulated portion extends into said epoxy body at each said conductive strand exit interface.

6. A power module comprising:
   a housing assembly defining an enclosed space;
   a load module, said load module disposed in said housing assembly;
   said load module including an epoxy body and a number of elongated conductive strands;
   each said conductive strand partially disposed in said epoxy body;
   each said conductive strand including a conductive member and a limited insulator;
   wherein each said limited insulator is disposed on selected portions of an associated conductive member;
   wherein said epoxy body is a thermally conductive body;
   wherein said housing assembly includes a number of generally planar sidewalls;
   wherein said epoxy body is a generally planar body including a planar outer surface; and wherein said epoxy body planar outer surface is directly coupled to one said housing assembly.

7. The power module of claim 6 wherein:
each said conductive strand is electrically insulated over substantially an entire length of each said conductive strand; and
each said conductive strand is thermally conductively coupled to said epoxy body.

8. The power module of claim 6 wherein each said limited insulator disposed on a limited portion of each said conductive member whereby each said conductive member includes a number of bare portions and a number of insulated portions.

9. The power module of claim 8 wherein:
each said conductive strand includes an embedded portion and an exposed portion;
wherein each said conductive strand bare portion is substantially coextensive with each said conductive strand embedded portion;
wherein each said conductive strand insulated portion is substantially coextensive with each said conductive strand exposed portion; and
wherein each said conductive strand bare portion is directly coupled to said epoxy body.

10. The power module claim 9 wherein:
each said conductive strand includes an exit interface disposed at a surface of said epoxy body; and
wherein each said conductive strand insulated portion extends into said epoxy body at each said conductive strand exit interface.

\* \* \* \* \*